United States Patent
Kelly

(10) Patent No.: US 8,206,645 B2
(45) Date of Patent: *Jun. 26, 2012

(54) PREPARATION OF FILLER-METAL WELD ROD BY INJECTION MOLDING OF POWDER

(75) Inventor: Thomas Joseph Kelly, Cincinnati, OH (US)

(73) Assignee: General Electric Company, Schenectady, NY (U (*) Notice: Subject to any disclaimer, the term of this patent is extended or adjusted under 35 U.S.C. 154(b) by 0 days.

This patent is subject to a terminal disclaimer.

(21) Appl. No.: 13/207,891

(22) Filed: Aug. 11, 2011

(65) Prior Publication Data

US 2011/0293462 A1     Dec. 1, 2011

Related U.S. Application Data

(63) Continuation of application No. 11/552,778, filed on Oct. 25, 2006, now abandoned, which is a continuation of application No. 10/900,803, filed on Jul. 27, 2004, now abandoned.

(51) Int. Cl.
  B23K 35/22    (2006.01)
  B23K 35/00    (2006.01)
(52) U.S. Cl. .................................. 419/36; 219/146.1
(58) Field of Classification Search ............. 419/36; 219/146.1
  See application file for complete search history.

(56) References Cited

U.S. PATENT DOCUMENTS

| | | |
|---|---|---|
| 3,701,444 A | 10/1972 | Clement et al. |
| 4,129,462 A | 12/1978 | Korenko |
| 4,213,026 A | 7/1980 | Duvall et al. |
| 4,426,428 A | 1/1984 | Kammer et al. |
| 4,624,706 A | 11/1986 | Badia |
| 4,673,123 A | 6/1987 | Shin et al. |
| 4,846,885 A | 7/1989 | Asphahani et al. |
| 5,051,112 A | 9/1991 | Keshavan et al. |
| 5,332,628 A | 7/1994 | Drossman |
| 5,453,243 A | 9/1995 | Hansen et al. |
| 5,525,779 A | 6/1996 | Santella et al. |

(Continued)

FOREIGN PATENT DOCUMENTS

DE      19935276 A      2/2000

(Continued)

OTHER PUBLICATIONS

Valencia J.J. et al.: "Microstructure and mechanical properties of inconel 625 and 718 alloys processed by powder injection molding." Proceedings of the International Symposium on Superalloys 718, 625, 706 and Various Derivatives, 1994, pp. 935-945, XP008059325 Warrendale, PA 15086.

Primary Examiner — Jessica L Ward
Assistant Examiner — Alexander Polyansky
(74) Attorney, Agent, or Firm — McNees Wallace & Nurick LLC

(57) ABSTRACT

A method for preparing a filler-metal weld rod of a filler-metal composition includes the steps of centerless grinding the filler metal weld rod of a forced mixture of a mass of titanium aluminide intermetallic alloy powder that was used to form the weld rod, and hot isostatic pressing the filler-metal weld rod at a temperature greater than 2150° F., at a pressure between about 15,000 pounds per square inch and about 25,000 pounds per square inch and for a time of about 1 to 5 hours, thereby increasing the relative density to between about 98% and about 99%.

15 Claims, 2 Drawing Sheets

U.S. PATENT DOCUMENTS

| | | |
|---|---|---|
| 5,682,665 A | 11/1997 | Svanberg |
| 5,989,493 A | 11/1999 | La Salle et al. |
| 6,238,498 B1 | 5/2001 | Ohriner et al. |
| 6,300,588 B1 | 10/2001 | Hughes et al. |
| 6,361,739 B1 | 3/2002 | Sreshta et al. |
| 6,440,358 B1 | 8/2002 | Sreshta et al. |
| 6,465,755 B2 | 10/2002 | Hughes et al. |
| 6,482,352 B1 | 11/2002 | Sakata et al. |
| 6,555,051 B1 | 4/2003 | Sakata et al. |
| 6,596,963 B2 | 7/2003 | Kelly |
| 6,750,430 B2 | 6/2004 | Kelly |
| 7,165,325 B2 | 1/2007 | Imano et al. |
| 2002/0178862 A1 | 12/2002 | Smith et al. |
| 2003/0041436 A1 | 3/2003 | Kelly et al. |
| 2003/0042233 A1 | 3/2003 | Kelly et al. |
| 2004/0118245 A1 | 6/2004 | Ott et al. |
| 2005/0123433 A1 | 6/2005 | Li et al. |

FOREIGN PATENT DOCUMENTS

| | | |
|---|---|---|
| EP | 208496 A1 | 1/1986 |
| EP | 1287943 A1 | 3/2003 |
| EP | 1119429 B | 7/2003 |
| EP | 1410872 B1 | 10/2006 |
| JP | 61017398 | 1/1986 |
| JP | 03232904 | 10/1991 |
| JP | 405005105 A | 1/1993 |
| JP | 05115995 | 5/1993 |
| JP | 2000328103 | 11/2000 |
| WO | 0012248 | 3/2000 |

PREPARATION OF FILLER-METAL WELD ROD BY INJECTION MOLDING OF POWDER

CROSS REFERENCE TO RELATED APPLICATIONS

This patent application is a continuation of U.S. patent application Ser. No. 11/552,778, now allowed, filed on Oct. 25, 2006, which is a continuation of U.S. patent application Ser. No. 10/900,803, filed Jul. 27, 2004, now abandoned, the entirety of which are hereby incorporated by reference.

FIELD OF THE INVENTION

This invention relates to the preparation of filler-metal weld rod and, more particularly, to the preparation of weld rod of difficult-to-deform alloys.

SUMMARY OF THE INVENTION

In a form of welding, a metallic article to be welded is locally melted, and the melted metal is mixed with a second metal. The temperature is thereafter reduced so that the melted mixture solidifies. In one approach, the second metal is another article, so that the two articles are joined together. In another approach, the second metal is an overlay deposit that is also melted during the welding process, with the result that the first article is overlaid with the second metal.

A filler metal may be used in either of these approaches. In the joining of two articles by welding, the filler metal may be added into the melted zone to fill the space between the two articles. In the overlay process, the filler metal may form substantially the entire overlay. The filler metal may be the same as one or both of the articles being joined in the first approach. In the second approach, the filler metal may be the same as the article being overlaid, such as when the dimensions of the article are being restored during a repair process, or of a different composition to provide particular properties to the surface of the overlaid article.

The filler metal is often supplied as a weld rod that is used in automated welding apparatus and other welding procedures such as manual welding. (As used herein, "rod" and "weld rod" include physical forms that are considered rods and also physical forms that are considered wires, avoiding the need for any arbitrarily selected distinction as to whether the physical form is a rod or a wire.) A heat source, such as an electrical welding power supply or a beam source such as a laser or electron beam, heats the region of the article to be melted, forming a molten pool. The filler-metal weld rod is gradually fed into the molten pool to supply the desired volume of the filler metal.

The filler metal may be produced in rod form in various ways. In one approach, it is cast as a billet and then extruded or wire drawn to smaller transverse size. In another approach, it is consolidated as a powder into a billet, and then extruded or wire drawn to smaller transverse size. In either of these fabrication techniques, the extruded article is centerless ground to achieve the desired shape and size, and to remove the remnants of the extrusion operation. In other approaches, the rod may be cast to shape from powder or produced from a tube filled with a powder mixture.

Some alloys of interest as filler metals in welding applications, notably titanium aluminides and nickel-base superalloys with a high volume fraction of gamma prime phase when heat treated, cannot be wire drawn due to their work hardening properties and limited ductilities. The welding filler metal weld rod is therefore conventionally produced by a specialized extrusion process, followed by acid etching and centerless grinding of the extruded material. As a result, the manufacturing yields of usable weld rod are low, typically about 25 percent of the weight of the starting material. The process is also relatively expensive. The cost of the weld rod is therefore high, relative to the material cost. More recently, techniques have been developed to make the weld rod from powder by specialized casting or wire drawing of a powder-filled tube.

Although the recently developed processes for manufacturing titanium aluminide and high-gamma prime nickel-base superalloys are operable, there continues to be a need for a further-improved approach to the fabrication of weld rod and related types of products. The present invention fulfills this need, and further provides related advantages.

BRIEF SUMMARY OF THE INVENTION

The present approach provides a method for producing filler-metal weld rod that is widely applicable. However, the process is most advantageously applied to weld rod wherein the filler metal is a difficult-to-work material such as a high-gamma prime nickel-base superalloy or a titanium aluminide, because there is no gross deformation of the weld rod required during the manufacturing process. The present approach produces a weight yield of usable weld rod, as compared with the weight of the starting material, of near 100 percent. There is excellent process economics and reduced cost of the weld rod. The quality of the weld rod is high, with low incidence of defects that can be transferred to the welded structure. New compositions may be readily prepared by the present approach.

A method for preparing a filler-metal weld rod of a filler-metal composition comprises the steps of providing a mass of metallic powders, wherein the mass of metallic powders together have the filler-metal composition, and mixing the metallic powders with a temporary thermoplastic binder to form an injection-moldable mixture, preferably at a mixing temperature above the thermoplastic temperature of the thermoplastic binder. The injection-moldable mixture is thereafter injection molded at an injection-molding temperature above the thermoplastic temperature of the thermoplastic binder, to form an injection-molded rod. Thereafter, excess thermoplastic binder is removed from an external surface of the injection-molded rod. It is preferred that the process be performed without any added water present, in the thermoplastic binder or otherwise. The injection-molded rod is thereafter sintered, preferably by solid-state sintering, to form the filler-metal weld rod. The temporary thermoplastic binder is removed in the step of sintering. The filler-metal weld rod preferably has a cylindrical diameter of from about 0.010 to about 0.250 inch, more preferably from about 0.035 to about 0.070 inch. Optionally, the filler-metal weld rod may be centerless ground after sintering or further densification treatment.

The metallic powders may be prealloyed and all of substantially the same composition. The metallic powders may instead be of different compositions, but selected so that their net composition is the filler-metal composition. The prealloyed approach is preferred, so that the finished weld rod is macroscopically and microscopically uniform throughout and already of the filler-metal composition throughout. Otherwise, some alloying is required during the processing or the use of the weld rod in a welding procedure, and there is a possibility of incomplete alloying although full alloying occurs during the subsequent welding operation. In any event, it is preferred that the metallic powders are generally spherical with a diameter of not greater than about 400 micrometers.

The present approach does not require gross deformation of the weld rod at any stage of its fabrication. Consequently, it is most beneficially used to prepare weld rod of filler-metal compositions that are difficult to deform because of their high strengths, low ductilities, or other properties. One preferred filler metal is a nickel-base superalloy that is heat treatable to produce more than about 30 volume percent gamma prime phase. Examples include RENE™ 142 alloy and RENE™195 alloy. Another preferred filler metal is an intermetallic alloy such as a titanium-base intermetallic alloy. An example is a composition a nominal filler-metal composition in atomic percent of from about 45.5 to about 48.0 percent aluminum and from about 48 to about 50.5 percent titanium, with the balance other elements.

The present approach is amenable to incorporating nonmetallic particles into the weld rod. In this approach, nonmetallic particles are mixed with the metallic powders and with the thermoplastic binder prior to injection molding.

The injection molding may be accomplished by any operable approach. Preferably, an injection-molding apparatus is provided. The injection-molding apparatus includes an injection head with an injection nozzle, and a movable receiver positioned to receive the injection-moldable mixture flowing from the injection nozzle. The injection-moldable mixture is loaded into the injection head. The injection-moldable mixture is forced out of the injection nozzle onto the movable receiver, while moving the movable receiver away from the injection nozzle at the same linear rate as the injection-moldable mixture is forced from the injection nozzle.

After the step of sintering, the filler-metal weld rod typically has a relative density of not greater than 90 percent. For many welding applications, this relative density of the filler-metal weld rod is satisfactory. If a higher relative density is desired, after sintering the filler-metal weld rod may be densified to greater than 90 percent relative density by hot isostatic pressing.

The present approach provides a convenient and economical approach to producing filler-metal weld rod. Filler-metal weld rod of any composition that is available in powder form may be made, even of difficult-to-draw metals such as high-gamma prime nickel-base superalloys and intermetallics. Compositional control of the weld rod is highly precise. New compositions may be readily produced, without the extensive experimentation and process development required in most other processes when making weld rod of a new composition. The oxygen content of the final weld rod is below that expected from the oxygen contents of the starting materials, suggesting a chemical reaction and removal of the oxygen.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
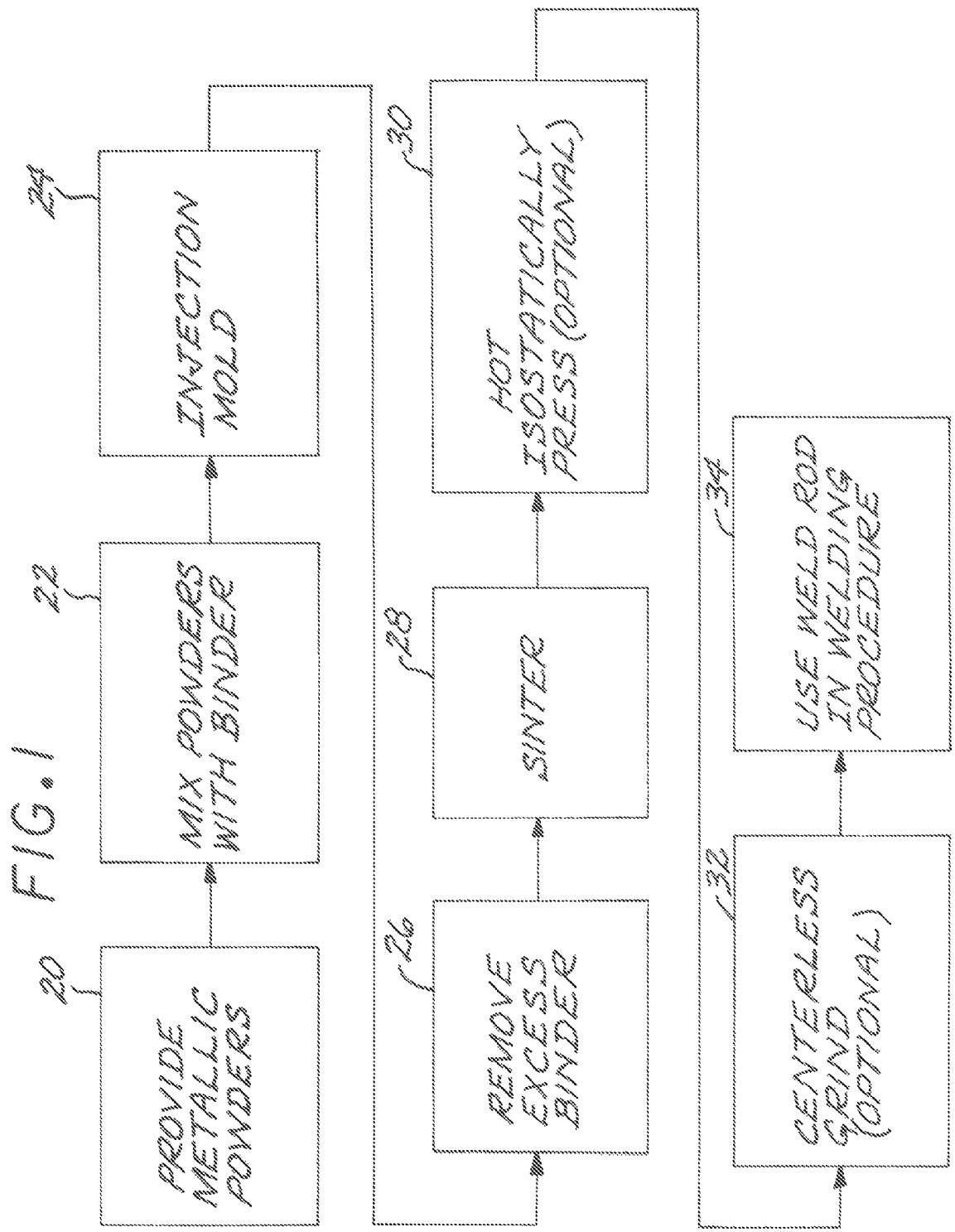
FIG. 1 is a block flow diagram of an approach for practicing the invention.

FIG. 1 depicts the steps in a method for preparing a filler-metal weld rod of a filler-metal composition. A mass of metallic powders is provided, step 20. The mass of metallic powders taken together have the filler-metal composition. The metallic powders are preferably prealloyed. That is, each powder particle has the net filler-metal composition as to metallic elements. Prealloyed metallic powders for compositions of interest are available commercially, or can be prepared specially by known techniques. The metallic powder particles may instead be of different compositions, but selected so that the net composition of all of the metallic powder particles taken together is the filler-metal composition of interest.

The present approach is operable to produce any of a wide range of filler-metal compositions. As long as prealloyed powders or powders compositions can be combined to define a composition of interest are available, the present approach may be utilized. However, some filler-metal weld-rod compositions are of particular interest, because they are difficult or impossible to produce by conventional techniques. One preferred filler metal is a nickel-base superalloy that is heat treatable to produce more than about 30 volume percent gamma prime phase. Members of this class of materials work harden so rapidly and are of such limited ductility that it is difficult to produce them by wire drawing or other technique requiring gross deformation of the material to form the weld rod of this filler metal. Examples of such high-gamma prime nickel-base superalloys include RENE™ 142 alloy having a nominal filler-metal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and RENE™ 195 alloy having a nominal filler-metal composition in weight percent of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities.

Another preferred filler metal is an intermetallic alloy such as a titanium-base intermetallic alloy, which also has a high rate of work hardening and limited ductility, and therefore is difficult or impossible to form into weld rods by gross deformation processes. Titanium aluminide is an example. One such class of titanium aluminide filler-metal weld rods have a composition in atomic percent of from about 45.5 to about 48.0 percent aluminum and from about 48 to about 50.5 percent titanium, with the balance other elements. Examples of other intermetallic alloys of interest include nickel aluminide, niobium silicide, and molybdenum silicide.

Some other alloys of interest are difficult to manufacture as weld rod because of their high work hardening rates that make them difficult to draw at room temperature. The conventional approach to weld-rod fabrication for these materials requires multiple steps of cold drawing and annealing, so that the production cost is high. The present approach allows the production of such materials much more economically. Examples include Waspalloy, having a nominal composition in weight percent of 13.0 percent cobalt, 0.04 percent carbon, 1.5 percent aluminum, 3.0 percent titanium, 19.0 percent chromium, 4.3 percent molybdenum, balance nickel; Ti-64, having a nominal composition in weight percent of 6 percent aluminum, 4 percent vanadium, balance titanium; A286, having a nominal composition in weight percent of 24-27 percent nickel, 13.5-16 percent chromium, 1.9-2.35 percent titanium, 1.0-1.5 percent molybdenum, 0.1-0.5 percent vanadium, 0.08 percent maximum carbon, 2.0 percent maximum manganese, 1.0 percent maximum silicon, 0.35 percent maximum aluminum, 0.030 percent maximum sulfur, 0.001-0.01 percent boron, balance iron; and Alloy 718, having a nominal composition in weight percent of from about 50 to about 55 percent nickel, from about 17 to about 21 percent chromium, from about 4.75 to about 5.50 percent columbium plus tantalum, from about 2.8 to about 3.3 percent molybdenum, from about 0.65 to about 1.15 percent titanium, from about 0.20 to about 0.80 percent aluminum, 1.0 percent maximum cobalt, and balance iron totaling 100 percent by weight.

Optionally, nonmetallic powders may be mixed with the metallic powders. The nonmetallic powders are typically hard intermetallic compounds such as carbides, borides, or the like that are not melted during welding but are incorporated into the weldment when the weld rod is later used in a welding procedure.

The metallic powders (and nonmetallic powders, if any) are mixed with a thermoplastic binder to form an injection-moldable mixture, step 22. The thermoplastic binder is temporary in the sense that it is removed in a later step and is not present in the final weld rod. The thermoplastic binder may be any operable thermoplastic binder suitable for sintering operations, preferably an organic or hydrocarbon thermoplastic binder. Examples include polyethylene, polypropylene, wax such as paraffin wax or carnuba wax, and polystyrene. A sufficient amount of the thermoplastic binder is used to render the mixture cohesive and pliable at temperatures above the thermoplastic temperature of the thermoplastic binder. The mixing of the powders and the binder is preferably performed at a mixing temperature that is above the thermoplastic temperature of the thermoplastic binder, which is typically 200° F. or greater but depends upon the specific thermoplastic binder material that is used. The thermoplastic binder material becomes flowable or "molten" at and above the thermoplastic temperature, which aids in the mixing. The mixing at this mixing temperature achieves a mixture that is flowable and injection moldable at or above the thermoplastic temperature, but which is relatively inflexible and hard below the thermoplastic temperature.

The injection-moldable mixture preferably does not contain any added water, although there may be a minor amount of water present as an impurity. A substantial amount of water, if present, would chemically react with the constituents of typical alloys of interest. The presence of a significant amount of water may also lead to centerline porosity after injection molding and sintering. Centerline porosity, if present, may be removed by swaging or a similar mechanical deformation process where the alloy is malleable. However, the removal of the centerline porosity adds to the cost of the product, a cost that is avoided in the present approach. Additionally, such gross mechanical deformation processes cannot be readily used with many alloys that may be made into filler-metal weld rods by the present approach due to their limited ductilities, such as intermetallic alloys and high-gamma-prime nickel-base superalloys. Hot isostatic pressing cannot generally be used to close internal porosity. Consequently, approaches that produce centerline porosity cannot be used to produce weld rods of many of the materials of most interest. The combination of little or no water, use of thermoplastic binder, and elevated-temperature injection molding of the present approach aids in avoiding the centerline porosity, and none has been observed in prototype specimens of weld rod produced by the present approach. Accordingly, it is preferred that the thermoplastic binder is non-aqueous, water is not mixed with the injection-moldable mixture, and no water is used in the subsequent step of removal of excess thermoplastic binder.

Figure 2:
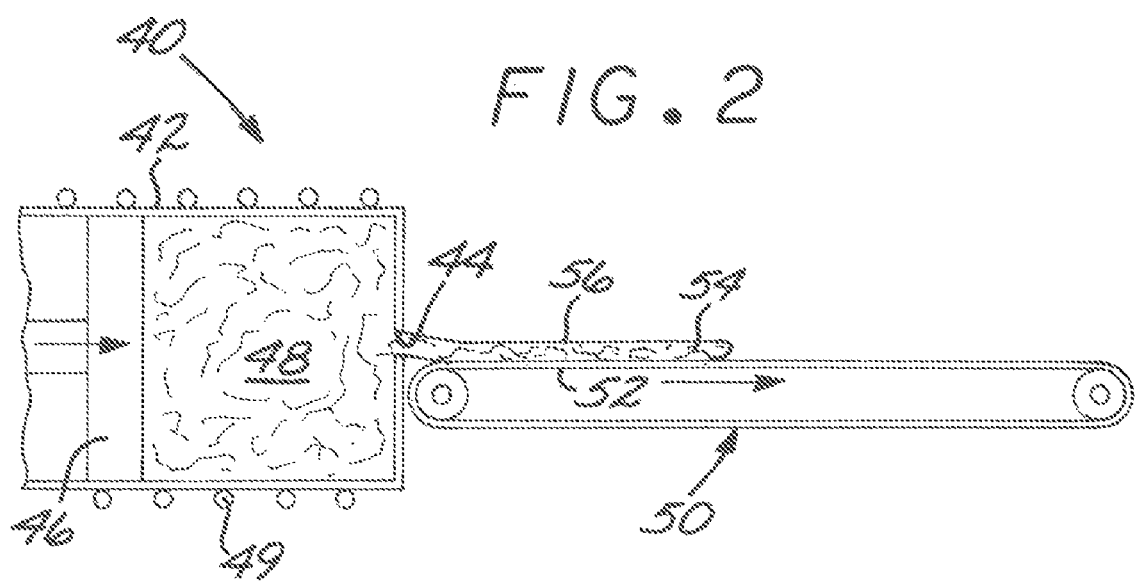
FIG. 2 is a schematic illustration of an injection-molding apparatus.

The injection-moldable mixture of metallic powders and thermoplastic binder is thereafter injection molded to form an injection-molded rod, step 24. The injection molding step 24 is performed with the injection-moldable mixture at an injection-molding temperature above the thermoplastic temperature of the thermoplastic binder. The thermoplastic binder is therefore flowable, reducing the friction with the injection nozzle during the injection molding. Any type of operable injection-molding apparatus may be used to accomplish step 24. A preferred injection-molding apparatus 40 is illustrated in FIG. 2. The injection-molding apparatus 40 includes an injection head 42 in the form of a chamber, with an injection nozzle 44 as the outlet of the chamber. A movable piston 46 forces the injection-moldable mixture 48 contained within the injection head 42 through the injection nozzle 44. The injection head 42 includes a controllable heater 49 that heats the injection-moldable mixture to the injection-molding temperature. The injection nozzle 44 preferably has a circular cross section, although it could have other shapes.

Preferably, no closed mold is used to receive and shape the injection-moldable mixture 48 as it flows from the injection nozzle 44. Because of the rod shape of the weld rod that is being made, such a closed mold would have to be elongated. It would be difficult to injection mold into such an elongated hollow mold due to friction. Instead, a movable receiver 50 is positioned to receive the injection-moldable mixture 48 that flows from the injection nozzle 44. A receiving surface 52 of the movable receiver 48 moves away from the injection nozzle 44 at a linear rate that is adjusted to be the same as the linear rate at which the injection-moldable mixture 48 flows from the injection nozzle 44. This movement allows the injection-moldable mixture 48 to be smoothly and continuously deposited onto the moving receiving surface 52. The shape of the injection-moldable mixture 48 is maintained by the combination of this movement and the consistency of the mixture of the metal powders and the thermoplastic binder. In FIG. 2, the movable receiver 50 is depicted as a continuous conveyer, but it could be any other operable structure such as a movable plate-like surface.

To perform the injection molding step 24 using this preferred injection-molding apparatus 40, the injection-moldable mixture 48 is loaded into the injection head 42. The piston 46 is moved to force the injection-moldable 48 mixture out of the injection nozzle 44 and onto the movable receiver 50. The receiving surface 52 of the movable receiver 50 moves away from the injection nozzle 44 at the same linear rate as the injection-moldable mixture 48 is forced from the injection nozzle 44, so that the injection-molded mixture is deposited upon the receiving surface 52 to form an injection molded rod 54. The injection-moldable mixture 48 is above the thermoplastic temperature of the thermoplastic binder as it emerges from the injection nozzle 44. The injection-moldable mixture quickly cools so that by a point about 2 inches or so from the injection nozzle 44 the injection-moldable mixture 48 is below the thermoplastic temperature of the thermoplastic material and is therefore relatively rigid and hard. It may therefore be picked up and handled with care.

Any excess thermoplastic binder is thereafter removed from an external surface 56 of the injection-molded rod 54, step 26. The excess thermoplastic binder is readily removed with a solvent for the excess thermoplastic binder. The solvent is contacted to the external surface 56 to dissolve the excess thermoplastic binder at the surface of the injection-molded rod 54 and below the surface as well. The solvent is selected according to the specific thermoplastic binder that is used. The solvent is preferably not aqueous in nature.

Figure 3:
FIG. 3 is an elevational view of a filler-metal weld rod produced by the approach of FIG. 1.

The injection-molded rod 54 is thereafter sintered, step 28, at a sintering temperature to form a filler-metal weld rod 58, illustrated in FIG. 3. The sintering is preferably performed in a vacuum oven. As the temperature of the injection-molded rod 54 is increased, the remaining temporary thermoplastic binder is evaporated and removed, preferably leaving no trace chemicals that might later contaminate the weld. The sintering is preferably solid-state sintering and thus below the melting point of the metal. After sintering, the filler-metal weld rod 58 preferably has a cylindrical diameter of from 0.010 inch to 0.250 inch, preferably 0.035 to 0.070 inch. The diameter of the injection-molded rod 54 is therefore somewhat greater than this sintered cylindrical diameter of the filler-metal weld rod 58, to account for shrinkage during sintering. The filler-metal weld rod 58 may be of a selected short length or of a much longer length for use in automated welding apparatus.

The sintering step 28 preferably sinters the filler-metal weld rod 58 to a relative density of not greater than 90 percent. The "relative density" is the percentage of the full density that is reached. For example, the weight of a weld rod 58 of 90 percent relative density is 90 percent of the weight of a weld rod of the same volume and same material, but of full density. Preliminary studies have demonstrated that a relative density of 90 percent or slightly lower is sufficient for the weld rod 58 to perform as required in subsequent welding operations.

On the other hand, for some other welding operations the filler-metal weld rod 58 must have a higher relative density in order to perform successfully. The higher relative density is preferably not achieved with further sintering, because the sintering times and temperatures become prohibitively large. Instead, to achieve a higher relative density the filler-metal weld rod is preferably optionally further densified by a process such as hot isostatic pressing, step 30. Hot isostatic pressing at a temperature of greater than about 2100° F. for nickel-base superalloys or greater than about 2150° F. for titanium aluminides, at a pressure of from about 15,000 to about 25,000 pounds per square inch, and for a time of about 1-5 hours increases the relative density of the weld rod 58 to about 98-99 percent.

Initial studies indicate that the as-fabricated weld rod 58 is sufficiently straight, of round cross section, and of the desired diameter to be used for most applications. Centerless grinding, step 32, may optionally be used to improve the quality of the surface finish of the weld rod 58, if desired.

The final filler-metal weld rod 58 is used in a welding procedure, step 34. The welding may be surface welding of a single article. Such welding is used, for example, to repair a damaged region at the surface of the article, and for this application the composition of the filler metal is typically the same as that of the substrate being repaired. Surface welding may also be used to apply a coating, such as a hard facing, to the surface of the article. The filler-metal weld rod 58 may also be used to join two or more pieces together by welding.

The present approach has been reduced to practice to make 0.050 inch diameter weld rod of RENE™ 142 alloy, in pieces about 24 inches in length, both with and without steps 30 and 32 of FIG. 1. There were no centerline defects.

While the invention has been described with reference to a preferred embodiment, it will be understood by those skilled in the art that various changes may be made and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for preparing a filler-metal weld rod of a filler-metal composition, comprising the steps of:
   centerless grinding the filler metal weld rod of a forced mixture of a mass of titanium aluminide intermetallic alloy powder that was used to form the weld rod; and thereafter
   hot isostatic pressing the filler-metal weld rod at a temperature greater than 2150° F., at a pressure between about 15,000 pounds per square inch and about 25,000 pounds per square inch and for a time of about 1 to 5 hours, thereby increasing the relative density to between about 98% and about 99%.

2. The method of claim 1, wherein the titanium aluminide intermetallic alloy powder has a nominal filler-metal composition in atomic percent of from about 45.5 to about 48.0 percent aluminum and from about 48 to about 50.5 percent titanium, with the balance other elements.

3. The method of claim 1, wherein the mass of the titanium aluminide intermetallic alloy powder further includes a filler-metal composition and nonmetallic particles mixed with the mass of titanium aluminide intermetallic alloy powder.

4. The method of claim 1, including an additional step, before the step of centerless grinding, of mixing the mass titanium aluminide intermetallic alloy powder with a temporary thermoplastic binder to form a mixture.

5. The method of claim 4, including an additional step, before the step of centerless grinding, and after the step of mixing, of forcing the mixture through a nozzle at a temperature above the thermoplastic temperature of the thermoplastic binder to form a rod.

6. The method of claim 5, including an additional step, before the step of centerless grinding, and after the step of forcing, of removing excess thermoplastic binder from an external surface of the rod using a nonaqueous solvent.

7. The method of claim 6, including an additional step, before the step of centerless grinding, and after the step of removing, of sintering the rod to form the filler-metal weld rod having a relative density of not greater than 90 percent, wherein the temporary thermoplastic binder is removed in the step of sintering.

8. The method of claim 7, wherein the step of sintering includes the step of preparing the filler-metal weld rod having a cylindrical diameter of from 0.010 to 0.250 inch.

9. The method of claim 7, wherein the step of sintering includes the step of sintering the filler-metal weld rod to a relative density of not greater than 90 percent.

10. The method of claim 6, wherein the non-aqueous solvent is contacted to the external surface.

11. The method of claim 6, wherein the non-aqueous solvent dissolves the excess thermoplastic binder.

12. The method of claim 6, wherein the non-aqueous solvent dissolves the excess thermoplastic binder on the external surface.

13. The method of claim 6, wherein the non-aqueous solvent dissolves the excess thermoplastic binder below the external surface.

14. The method of claim 6, wherein the excess thermoplastic binder includes wax.

15. The method of claim 6, wherein the excess thermoplastic binder includes polyethylene.

* * * * *